June 30, 1931.                    M. ASTAFIEV                    1,812,765
                                 OPTICAL SYSTEM
                            Filed Aug. 26, 1929                 2 Sheets-Sheet 1

M. Astafiev
   INVENTOR

By: Marks & Clerk
         Attys.

Patented June 30, 1931

1,812,765

UNITED STATES PATENT OFFICE

MICHAEL ASTAFIEV, OF CHELSEA, LONDON, ENGLAND, ASSIGNOR, BY MESNE ASSIGN-MENTS, TO ART PHOTOGRAVURE COMPANY LIMITED, OF LONDON, ENGLAND

OPTICAL SYSTEM

Application filed August 26, 1929, Serial No. 388,538, and in Great Britain September 7, 1928.

This invention relates to optical systems suitable for the production of a number of like images as for colour photography work and of the kind which can divide up a single incident beam of light into a number of parts by means of an arrangement of oppositely facing reflectors arranged on planes crossing for example at right angles and substantially equally inclined to the axis of the system or to the direction of normal incident rays thereto, the reflectors comprising for example suitably pierced metallic elements arranged on diagonal planes of an imaginary cube or on the interfaces of a cube-like assemblage of like triangular prisms of suitable transparent material such as glass. It relates more particularly but not exclusively to certain forms of such devices described or illustrated in the specification of my United States Letters Patent No. 1,662,693.

The object of the present invention is the provision of improvements in systems of the above kind whereby more even illumination of and exact similarity between each of the pictures or images produced by division of the incident light beam may be obtained than has hitherto been possible.

The invention consists in light dividing systems or devices of the kind referred to wherein provision is made for substantially equalizing, for light rays of different inclinations within the chosen angle of vision of the system, the effective or working pupils determining any one or more of the divided or emergent beams.

The invention further consists in a system or device according to the preceding paragraph wherein provision is made for compensating for variations in opposite senses for inclined light rays of a light pupil and a blind or dark pupil therewithin.

The invention further consists in a system or device according to either of the preceding paragraphs wherein means externally determining a light pupil and means determining a blind pupil therewithin are adapted to co-operate in obtaining pupil equalization.

The invention further consists in a system or device according to any of the three preceding paragraphs wherein provision is made for causing the effective external periphery of an annular light pupil and the effective blind pupil therewithin to vary in similar senses.

The invention further consists in a system or device according to any of the four preceding paragraphs wherein provision is made for substantially centralizing in an annular light pupil the inner and the outer peripheries thereof.

The invention further consists in a system or device as set forth in any of the preceding paragraphs wherein provision is made for substantially equalizing the effective pupils for rays inclined on different sides of the axis of the system and forming a solid light beam.

The invention further consists in systems or devices according to any of the six preceding paragraphs wherein opaque non-reflecting areas or elements are provided and co-operate with apertures in one or more reflectors in determining the effective emergent pupil.

The invention further consists in light dividing apparatus, specific means hereinafter indicated and/or illustrated, including means for obtaining constancy of effective working pupils.

Referring now to the accompanying drawings:—

Figure 5:
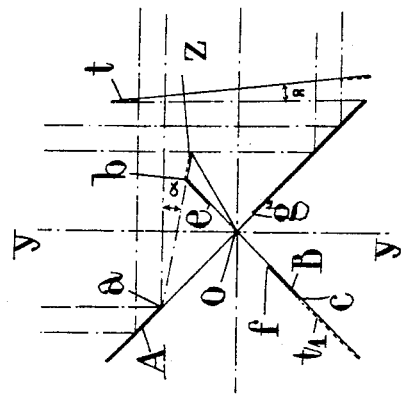
Figure 6:
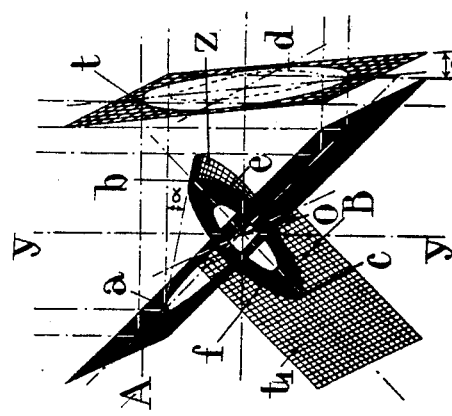
Figure 7:
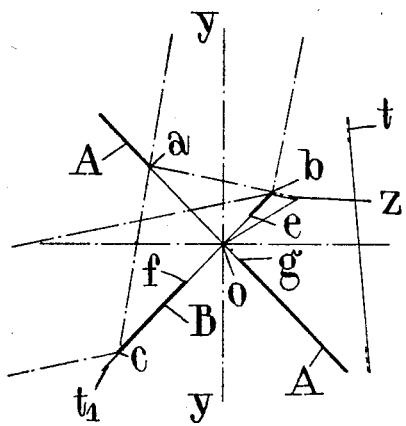
Figure 9:
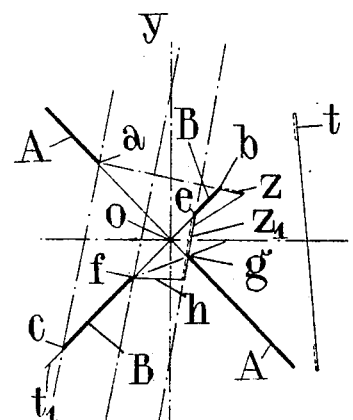
Figure 8:
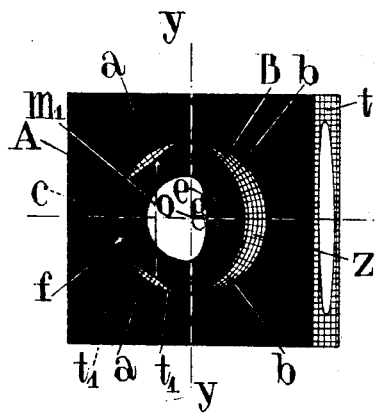
Figure 10:
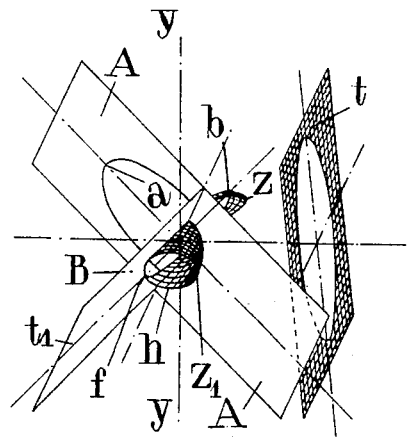

Figures 3 and 4 and 5 and 6 are views corresponding to Figures 1 and 2 as also are Figures 7 and 8 and 9 and 10 except that Figure 8 is a true plan of the system of Figure 7 and Figure 10 is a perspective view looking at the system of Figure 9 from below.

The pairs of Figures 3 and 4 to 9 and 10 inclusive embody progressively improvements according to this invention which co-operate in enabling a much improved and more effective whole to be obtained as will be hereinafter set forth.

In all these figures shaded or hatched areas represent opaque areas or elements which do not function as reflectors and the reflecting areas are shown in solid black.

Figure 1:
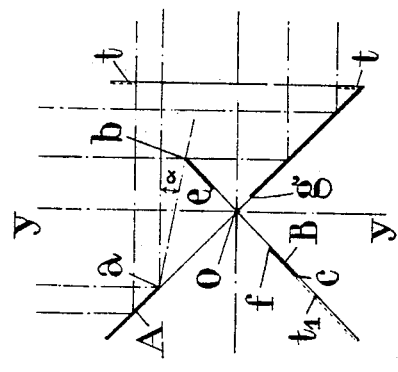
Figure 1 is a more or less diagrammatic central section through an optical system of the kind referred to, the section being taken in a plane normal to the crossing planes in which the reflecting surfaces are located.
Figure 2:
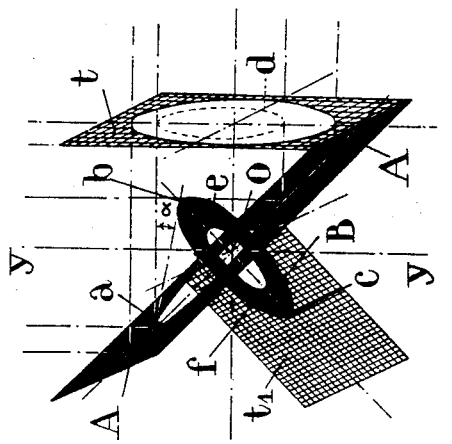
Figure 2 is a perspective semi-plan view of the system shown in Figure 1, incident light being assumed to fall on the system from above.
Figure 3:
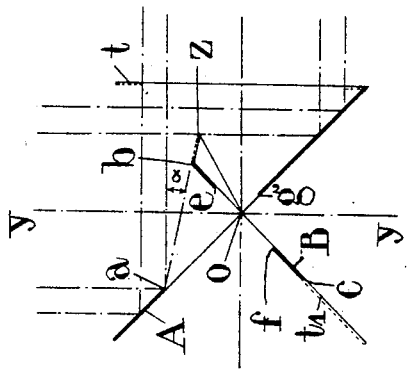

In explaining the carrying of this invention into effect in one form by way of example a system constructed somewhat on the lines of that shown in Figure 10 of my aforesaid United States patent specification is reproduced in Figures 1 and 2 herein and it is convenient to outline the functions and operation of the various reflectors and the like in such an arrangement which of course will be used in conjunction with a suitable objective or lens system usually a lens system of the kind shown in Figure 3 of the prior patent and other apparatus such as external mirrors often employed. The light rays from the object fall from above in Figures 1 and 2 and are divided up into three beams, two beams by sidewise reflection by the mirror surfaces A and B and the third beam without reflection by passing through the central aperture.

In the already patented form of the device shown in Figures 1 and 2 the two reflector surfaces are arranged in planes at right angles to one another and are presented to the object at an angle of 45° to the direction of the central point of the object, that is, to the principal axis Y, Y of the system as a whole. One of the reflectors B consists of a more or less annular ring located substantially symmetrically about the central point $o$ of the system and the other A consists of a rectangular surface within an aperture in which the ring reflector B is located, that part of said aperture located in front of the line of intersection of the crossing planes presenting to normal incident light rays a semi-circular outline and that part situated behind said line having a somewhat elliptic outline tangent in said line to the opening in the ring reflector. Behind the intersection of the reflectors the ring reflector B is bounded by an opaque non-reflecting area $t^1$.

Dealing first with the annular light pupil for the image reflected to the right-hand side of Figures 1 and 2 the outer periphery is determined by a circular diaphragm $t$ on the right-hand face of the cube or cube-like space including the reflectors and the inner pupil is determined both by the curved edge $a$ of the aperture in the large reflector A in front of the line of intersection $o$ of the planes and by the outer periphery $b$ of the forward half of the ring reflector B.

It will be clear that as the maximum distance between the external periphery $b$ of the ring reflector B and the intersection $o$ must necessarily be less than the maximum distance of the edge $a$ of the aperture in the other reflector A from said intersection in order to permit uninterrupted reflection to the right of inclined rays within the angle $\alpha$ equal approximately to one half of the total angle of view, the blind pupil in the emergent beam will be situated eccentrically of the pupil as a whole as indicated by the dotted ellipse $d$ of Figure 2 assuming the diaphragm $t$ is as usual centrally situated, that is, on an axis normal to the axis Y, Y passing through $o$ at the centre of the system.

Figure 4:
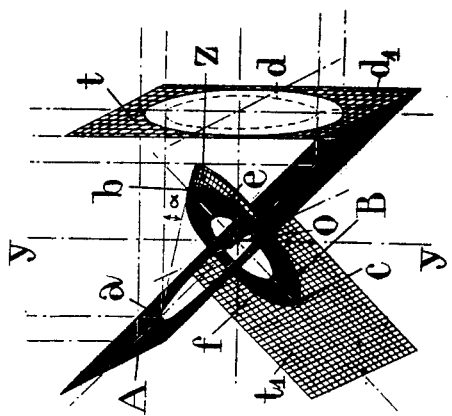

According to this present invention, referring to Figures 3 and 4, an opaque hood member $z$ is provided bordering the external periphery $b$ of the ring reflector in front of the intersection of the crossing planes, the surfaces in this member lying on lines tangent both to one or more points on the front edge $a$ of the aperture in the large reflector and also to points on the periphery $b$ of the ring reflector and the hood member is directed away from the large reflector. The width of the hood member varies progressively from minimum adjacent the line of intersection $o$ of the planes to maximum adjacent the foremost points on the outer edge of the ring reflector and said progressive variation in width is such that the opaque hood as shown in Figure 8 presents to normal incident rays an outline which is the counterpart of the forward edge $a$ of the aperture in the large reflector, and so equalizes the radial thickness of the annular pupil by enlarging the blind pupil on the region or side thereof $d_1$ which otherwise would be determined solely by the shadow cast by the forward portion of the ring reflector B upon the portion of the reflector A which lies behind the intersection line $o$.

By the above described means the blind pupil is made concentric with the external pupil periphery determined by the opaque side diaphragm $t$ which is in a plane normal to the direction of emergent non-inclined rays so that a truly annular beam will be produced. There will, however, be a variation in the effective size of the blind pupil for inclined rays and a variation in the opposite sense in the effective external periphery for rays of the same respective inclination. The effective external periphery will however vary equally for rays inclined to the same extent on opposite sides of the axis of the system, whereas the effective blind pupil, by reason of the stipulations made above regarding the distances of the reflector edges $a$ and $b$ from the intersection of the crossing planes, and the concomitant obliquity of the diaphragm or stop co-operatively presented by the edge $a$ and the edge of the opaque hood member $z$, will increase for rays inclined to the right of the axis and decrease for inclined rays on the left side of the axis. Thus, as the effective or working annular light pupil is the difference between the effective area presented by the large diaphragm $t$ and the effective area of the blind pupil, the working pupil (while its inner and outer peripheries may be made substantially concentric as and by the means described above) will be greater for rays inclined to the left of the axis than for rays of opposite inclination. There will thus be a variation in intensity of illumination over the area or width of an image formed by the working pupil. While such a variation may not exceed a very small percentage say 3 to 4 per cent. it can be further reduced, practically to elimination, by the expedient of disposing the side diaphragm $t$ as shown in Figures 5 and 6 in a plane at a slight inclination to the axis of the system, instead of parallel thereto as in Figures 1 and 2, the inclination $\gamma$ being so chosen, viz. made equal approximately to one half $\alpha$ above defined, that changes in the effective area presented by the diaphragm will compensate for the changes in the blind pupil i. e. when the blind pupil increases so will the effective aperture provided by $t$ increase and vice versa. The diaphragm $t$ may of course be located in front of the mirror system, and at a suitable inclination other than a right angle to the axis of the system to obtain the same compensating effect.

Referring now to the annular light pupil formed to the left by the ring reflector B in Figures 1 and 2 referred to, this will be determined externally by such factors as the radial width of the ring B, the relation between the maximum distance of the periphery $c$ of reflector B from the intersection $o$ of the crossing planes and the maximum distance from said intersection of the forward edge $a$ of the opening in the opposite reflector A, and internally the said pupil will be determined by the size of the inclined aperture in the centre of the ring, the forward and rearward edges of which aperture are designated $e$ and $f$ respectively.

The effective pupil for the left-hand image therefore represents the difference between the blind pupil, determined by an aperture in one of the crossing planes and therefore very substantially inclined to the axis of the system, and the pupil externally determined by the aperture between the opening in the large reflector A and the forward edge of the ring reflector B, which apertures will thus be inclined in opposite senses with respect to the axes of normal incident rays. The effective or working pupil will therefore be less for left-hand rays than for right-hand rays. As in the patented device, a form of which has been referred to, the non-reflecting opaque portion or area $t_1$ bounds the rearward edge of the ring reflector which edge is of uniform or regular curvature, and the region $c$ at which such bounding takes place may be so located as to compensate to some extent for growth in the size of the working pupils for right-hand rays. The expansion of the effective pupil under deflection of rays from left to right may thus continue only until the rays restricted by the forward edge $a$ of the opening in the large reflector pass on to the opaque portion $t_1$, after which the effective pupil will cease to expand and on the other hand may contract to such an extent that the pupil for extreme right-hand rays may not substantially differ from that for extreme left-hand rays. Equal illumination can thus be obtained in remote parts of the image but in the interval there is nevertheless considerable increase and decrease of the working pupil.

To avoid such variation, the shape of that part of the ring reflector lying behind the line of intersection of the planes is according to this invention made to depart from a regular annulus. Referring to Figures 7 and 8 which show the modification resorted to, while the aperture in and the forward portion of the ring reflector B are unaltered for the present purpose, the width of the reflector behind the intersection $o$ may vary reaching a maximum on a line normal to the line of intersection of the planes and meeting same at a point $o$ at the centre of the whole system. On the radially widest part of the ring the external periphery touches a point $c$ traced by a ray tangent to the foremost inner edge $a$ of the large reflector aperture and of extreme right-hand inclination. The periphery of the rear portion of the ring is also given as shown in Figure 8 a symmetrical re-entrant or ogee form so that in certain parts its width as $m_1$ taken in directions parallel with the line of intersection of the crossing planes is less than the width of aperture provided directly in front by the edge $a$ of the opening in the large reflector A. Such outline may be determined graphically for example by making a number of projected views of the edges $a$, $b$ and the opening $e$, $f$, say five in all, two as views in the direction of incident rays of extreme opposite inclinations respectively, one as viewed along the normal to the system and two as viewed in the directions of intermediate rays.

The several annuli produced will be found to increase in area progressively with declension of the rays from maximum left-hand inclination to maximum left-hand inclination. Taking as basis the area of the annulus from the projection in the direction of rays of maximum left-hand inclination, that is, the smallest annulus, by the aid of planimeter or the like it is easy to determine the area requiring elimination from the adjacent projected annulus in order that the two may be made equal. Such elimination is effected by imparting to the second projected annulus, at that part of the outline thereof determined by the edge $a$, two like symmetrically disposed steps each equal to one half of the area requiring elimination. Similarly, stage by stage, the remaining projected annuli are stepped in this way until the outline of the last annulus corresponding to rays of maximum right-hand inclination is provided with a succession of four sets of stepped regions and includes an area which, less the projected area of the opening $e, f$ within it, is equal to the area of the basic projected annulus.

To determine the true external outline to be imparted to the reflector B it is only necessary to project back from the projected and rectified annuli to the plane which is to contain the reflector whereupon a figure will result, elongated compared with the last mentioned annulus but otherwise corresponding in outline therewith.

It is preferred however to smooth away the stepped regions to provide the symmetrical curved re-entrant outline desired while maintaining the area of the reflector as projected back. As before the ring reflector behind the centre of the system would of course be bounded by an opaque non-reflecting area $t_1$.

For the purposes of the claims hereto appended it is convenient to call the projection of the edge $a$ upon the plane of the smaller or ring reflector B the parallel ray trace of said edge corresponding to parallel rays of any stated inclination, so that by following the instructions above given it will be seen that the greater the angle of incidence of rays upon the plane of the reflector B the greater is the ratio between the area on the said plane which is rendered opaque and non-reflecting and the area of the corresponding parallel ray trace.

Referring again to Figures 1 and 2 the light pupil forming the third image is solid and determined by at least two curved edges in openings in the two facing reflectors. The pupil may be determined at both sides for right-hand rays by the internal edges $e, f$ of the ring reflector B and for left-hand rays by one of said edges and the remote edge $a$ or $g$ of the aperture in the other reflector A. The arrangement may be such that while the pupil is a maximum for non-inclined rays and minimum for inclined rays, it will be equal or substantially so for both extreme left-hand and extreme right-hand rays. However, attempt at obtaining this effect by bringing the rearward edge $g$ of the large reflector aperture or an opaque crescent extension thereof equally close to the centre of the system as is the rearward internal edge $f$ of the ring reflector (whose location is fixed and may be made asymmetrical for technical reasons), results in a reduction of the size of aperture and hence in loss of light.

According to this invention and referring to Figures 9 and 10 an opaque tubular member $z_1$ is provided passing through the centre of the system tangent to the edges $e, f, g$ of the reflector openings and ending at $h$ behind the crossing planes on a plane normal to the axis of the system. The rearward edge $h$ of the tubular member which may be of a substantially cylindrical or conical shape determines the solid pupil with substantially no reduction in pupil dimensions or loss of light intensity and as it lies parallel with the intersection it will ensure substantial constancy of pupil size. The opaque tubular member also serves by the portion between $e$ and $g$ to prevent extraneous reflections, e. g. reflection of light from an objective or the like dealing with one image, through the centre of the system, to the objective or the like dealing with another image.

It is to be understood that modifications and additions may be made without departure from the spirit of the invention and that same can of course be applied to other arrangements of the kind referred to. For instance it is not essential that one mirror be an annular ring situated within a more or less similarly shaped opening in the other mirror, as the ring mirror may if desired be of for example rectangular frame-like form and may be located in a rectangular opening in the other mirror.

I claim:

1. An optical system comprising a pair of oppositely-facing reflectors disposed in and around the line of intersection of a pair of planes crossing each other at similar inclinations to a plane normal to the system and also including said line, which reflectors include an inner one passing through an opening in an outer one and provide edge regions situated at opposite inclinations with respect to said normal plane and respectively externally and internally defining a hollow image-forming beam of light rays emergent from said inner reflector, and means compensating for unequal rates of change of the effective sizes respectively of said edge regions with declension of incident light rays within a determined angle of vision, said means consisting of non-reflecting means in juxtaposition with that portion of the inner reflector which lies to one side of said normal plane and occupying an area within the parallel ray trace of the opening in the outer reflector upon the plane of the inner reflector, the ratio between which area and the area within said trace effective with respect to parallel rays of determined inclination varies progressively in the same sense as the angle at which said rays are incident to the plane of said inner reflector.

2. An optical system as claimed in claim 1, wherein said compensating means consists of an opaque non-reflecting element coplanar with and bounding said portion of the inner reflector and encroaching inwardly in directions parallel to said line over opposed regions of the said parallel ray trace of the opening in the outer reflector.

3. An optical system as claimed in claim 1, wherein said reflectors include an inner annular one passing through a curved-edge opening in an extended outer one and are each disposed substantially centrally about the said intersection, said reflectors together providing curved edge regions situated at opposite inclinations with respect to said normal plane which regions respectively externally and internally define an annular image-forming beam of light rays from said annular reflector and wherein said means consists of opaque non-reflecting means bounding the outside of that portion of the annular reflector which lies to one side of said line of intersection and occupying an area within and re-entrant with respect to said parallel ray trace of said opening in the extended reflector upon the plane of the annular reflector.

4. In an optical system comprising a pair of oppositely-facing reflectors disposed in and around the line of intersection of a pair of planes crossing each other at similar inclinations to a plane normal to the system and also including said line, which reflectors include an inner one passing through an opening in an outer one and provide edge regions situated at opposite inclinations with respect to said normal plane and respectively externally and internally defining a hollow image-forming beam of light rays emergent from said inner reflector, and having means compensating for unequal rates of change of the effective sizes respectively of said edge regions with declension of incident light rays within a determined angle of vision, opaque diaphragm means operative in externally defining an image-forming light beam comprising rays reflected from said outer reflector and means co-operating with said inner reflector in defining a dark pupil within and substantially centralized with respect to said last mentioned beam.

5. An optical system as claimed in claim 4, wherein said means which co-operates with the inner reflector consists of an opaque non-reflecting element tangent to that part of the edge of said inner reflector which lies to one side of said normal plane which element is directed away from said opening in the outer reflector and lies in the path of rays incident to the plane of the outer reflector to said one side of said normal plane.

6. An optical system as claimed in claim 4, wherein said diaphragm is located centrally about an axis passing through the centre of the system normal to said line of intersection which axis lies parallel to the direction at which rays incident along said normal plane pass through said diaphragm, and said diaphragm is contained in a plane displaced from normality with respect to said axis by an angle of the order of one half the angle of vision of the system.

7. In an optical system comprising a pair of oppositely-facing reflectors disposed in and around the line of intersection of a pair of planes crossing each other at similar inclinations to a plane normal to the system and also including said line, which reflectors include an inner one having an internal perforation and passing through an opening in an outer extended one and provide edge regions situated at opposite inclinations with respect to said normal plane and respectively externally and internally defining a hollow image-forming beam of light rays emergent from said inner reflector and having means compensating for unequal rates of change of the effective sizes of said beam-defining edge regions with declension of incident light rays within a determined angle of vision, aperture means within said inner reflector for defining a solid beam of light rays passing through the system without reflection, said means comprising an opaque non-reflecting element of hollow tubular form peripherally tangent in part to that portion of the edge of the perforation in said inner reflector which lies to one side of said normal plane and in part to that portion of the edge of the opening in said extended reflector which lies to the other side of said normal plane, said element terminating endwise in a plane normal to said normal plane and parallel to said before-mentioned line of intersection.

8. The hereinbefore-described improvements to crossing-reflector light beam dividing apparatus which include an opaque element operative in maintaining constant the effective size of a light pupil defining a hollow emergent beam for incident rays of all inclinations within a determined angle of vision, a second opaque element operative in centralizing a blind pupil within a second hollow emergent beam and a third opaque element operative in providing an edge defining a third and solid emergent beam which edge is normal to the direction of straight incident rays.

In testimony whereof I have signed my name to this specification.

MICHAEL ASTAFIEV.